Figure 1:
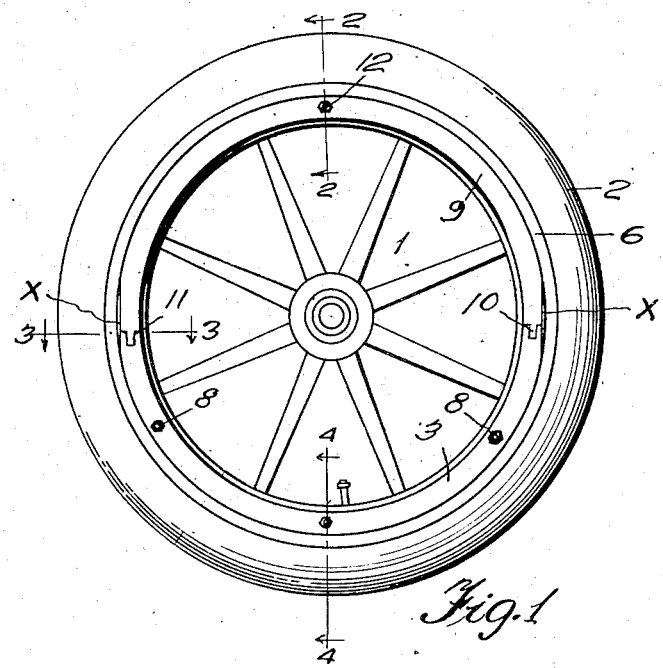
Figure 3:
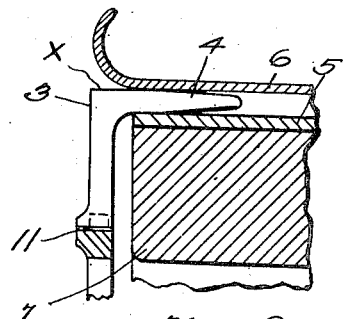
Figure 4:
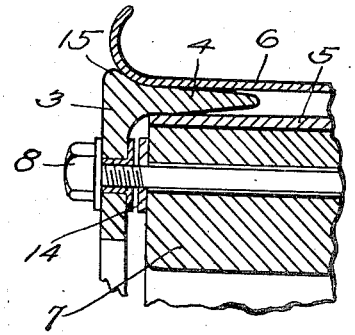
Figure 2:
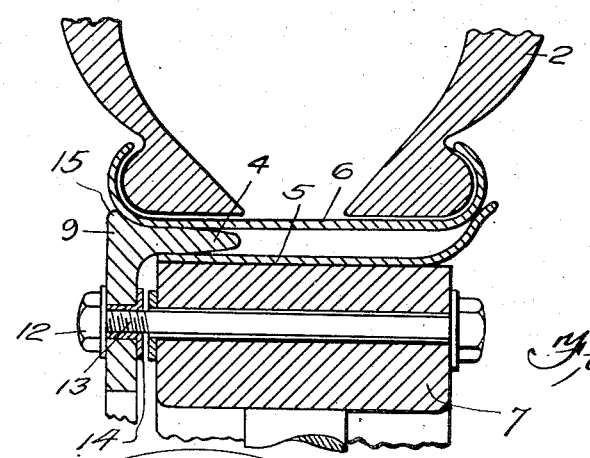
Figure 5:
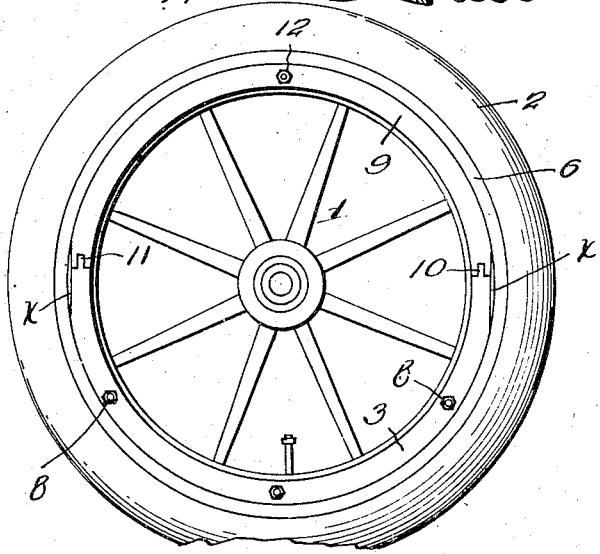

W. I. HOPKINS.
RIM LOCK.
APPLICATION FILED NOV. 18, 1918.

1,324,252.

Patented Dec. 9, 1919.

W. I. Hopkins
Inventor

UNITED STATES PATENT OFFICE.

WALTER I. HOPKINS, OF WASHINGTON, DISTRICT OF COLUMBIA.

RIM-LOCK.

1,324,252.   Specification of Letters Patent.   Patented Dec. 9, 1919.

Application filed November 18, 1918. Serial No. 263,068.

*To all whom it may concern:*

Be it known that I, WALTER I. HOPKINS, a citizen of the United States, residing at 225 Rhode Island Ave., N. W., in the city of Washington, District of Columbia, have invented certain new and useful Improvements in Rim-Locks, of which the following is a specification.

This invention relates to means for locking what are commonly known as demountable rims on wheels and has for its object the provision of simple and efficient means whereby the tires of automobiles or other vehicles, particularly resilient tires carried by the rim may be detached from, or securely and rigidly locked upon a wheel with the least expenditure of time and labor possible.

With this and other objects in view, which will appear as the description proceeds, the invention will be hereinafter more particularly described with reference to the accompanying drawings, which form a part of the specification and will be more particularly pointed out in the claims appended thereto.

In the drawings:

Figure I is an elevation of a wheel showing the rim locked thereon with my device.

Fig. II is a transverse sectional view taken on line 2—2 of Fig. I.

Fig. III is a transverse sectional view taken on line 3—3 of Fig. I.

Fig. IV is a transverse sectional view taken on line 4—4 of Fig. I.

Fig. V is a modified form of the device.

While in the drawings I have shown the device as applied more particularly to rims which carry pneumatic tires thereon such as are commonly used on automobiles, it can readily be applied to wheels of other vehicles where a detachable rim is employed. 1 represents a wheel of the type commonly used on automobiles. 2 represents a casing which may be provided with a pneumatic tube therein. 3 is an arcuate locking member extending something less than half way around the circumference of the wheel and carries an inwardly projecting wedge-shaped flange 4, which flange is adapted to be forced inwardly at right angles to the plane of the wheel and between the felly band 5 and rim 6, thus engaging felly band 5 and rim 6 and thereby providing a continuous bearing for the rim 6 throughout the entire length of member 3 and at the same time exerting an inward pressure upon the outer face of the rim 6. The member 3 can be adjusted inwardly or outwardly with relation to the felly 7 through the medium of the screw-threaded adjusting means 8, which means are similar to those employed for adjusting the short lugs commonly used for locking demountable rims on wheels.

9 is an arcuate pivotal complementary locking member which is adapted to swing outwardly from the face of the wheel, and which is similar in cross section to member 3, and which is hingedly related to member 3 as at 10 and 11, and thereby adapted to be swung outwardly until it assumes an angle of approximately 45° with relation to member 3 when it is desired to remove the rim from the wheel. The member 9 is held rigidly against the face of the felly by means of nut 12, which is adapted to engage a screw-threaded bolt 13, which passes through the felly 7 and member 9, which nut 12 is provided with a flange 14, which is adapted to force member 9 outwardly, thereby withdrawing flange 4 from engagement with the felly band 5 and rim 6 when the nut is turned in the left-hand direction. The diameter of the head of the nut being greater than the aperture in member 9 through which bolt 13 passes, will engage the outer face of member 9 and force it against the felly 7, thereby bringing flange 4 into frictional engagement with felly band 5 and rim 6 when the nut is turned in the right-hand direction, while at the same time holding the rim securely against outward movement by reason of the inward pressure exerted against it by the shoulder 15. One of the arcuate members 3 or 9 having a slightly wider radius than the other member, will result in the hinges having a binding effect laterally when the tongue portion of the hinge of member 9 is sprung into engagement with the eared hinge portion of member 3, the member of lesser radius acting as a spring held into distended position by the member of greater radius, thereby securing member 9 against movement by its own weight from any angle with relation to the plane of the wheel at which it may be placed.

Thus it will be seen that when the rim has been placed on the wheel and the locking member 9 forced into the position shown in Fig. I, the rim will be rigidly and securely locked thereon.

The fixed member 3 being less than a semicircle in its extent, its ends fall short of meeting the central diameter of the wheel, so that the pivotal point of members 3 and 9 is distant from the bolt 13, somewhat beyond the central diameter of the wheel, in order that the rim may drop slightly when released by the locking member 9 and thus free itself from the wedging action of the lower fixed locking member 3. But the axes of the hinges will be kept parallel to the diameter of the wheel. In order that the rim may be readily drawn from the wheel after locking member 9 has been swung outwardly until it assumes an angle of approximately 45° with relation to member 3, I cut away the shoulder 15 of fixed member 3 and pivotal member 9 for a short distance adjacent to their meeting ends, as indicated at X, and which gives clearance for the rim and allows it to readily pass over the shoulders of the locking members.

From the foregoing, it will readily be seen that by adjusting member 3 at the desired tension, that the tension around the entire circumference of the wheel can be made uniform through the medium of nut 12, and that a bearing surface will be provided through the medium of the flanges 4 for the rim 6 around the entire circumference of the felly band 5; and it will also be seen that by loosening the two adjusting means adjacent to the ends of member 3, thereby withdrawing the wedge shaped flange 4 from engagement with the felly band 5 and rim 6 at the ends of member 3 and driving nut 12 home, thereby forcing the wedge shaped flange of member 9 inwardly to its full limit at its center, and then forcing the ends of member 3 inwardly through the medium of adjusting means 8, an almost unlimited outward pressure can be exerted upon the rim as the two members 3 and 9 under this operation would become a toggle.

The operation of the device is as follows:
When it is desired to place a rim upon the wheel, nut 12 is unscrewed and locking member 9 drawn downwardly until it assumes an angle of approximately 45° with relation to member 3, when the rim is slipped over the felly band of the wheel and locking member 9 is moved upwardly into engagement with the felly band 5 and rim 6, when pressure is exerted upon it through the medium of nut 12, forcing it inwardly until the desired tension is secured.

In the modified structure shown in Fig. V, the arcuate, pivotal, locking member 9 is shown as being of less than a half circle, while in the structure shown in Fig. I the fixed arcuate member 3 is shown as being of less than a half circle. The operation of the two devices is practically the same, the only difference being that when the pivotal member 9 of the structure as shown in Fig. V is drawn downwardly, the rim will not settle or drop to the same extent as it will in the structure shown in Fig. I.

What I claim is:

1. A locking means for demountable wheel rims, comprising two arcuate members of different lengths pivotally related one the other and a substantially continuous wedge carried by said members.

2. A locking means for demountable wheel rims, comprising two arcuate members pivotally related one to the other, one of said members being longer than the other of said members, the axis of said pivotal relation being parallel to the diameter of the wheel.

3. A locking means for demountable wheel rims, comprising two arcuate members pivotally related one to the other, one of said members being less than half a circle, wedging means carried by said members and means for securing the parts to a wheel.

4. A securing means for demountable wheel rims, comprising a substantially continuous locking ring subdivided into a fixed and a movable part, the fixed part being less than half a circle, the movable part being pivotally related to the fixed part and means for securing the parts to a wheel.

5. A securing means for demountable wheel rims, comprising a substantially continuous locking ring subdivided into a fixed and movable part, one of the parts being less than half a circle, the movable part being pivotally related to the fixed part and means for securing the parts to a wheel.

6. A rim lock comprising two arcuate members, pivotally related one to the other, one of said members being less than half a circle, the two parts comprising a circle, in combination with a wheel and means for exerting pressure on the parts at right angles to the plane of the wheel.

7. In combination with a wheel means for securing a rim upon the wheel, comprising two arcuate members of different lengths pivotally related one to the other, an inwardly extending flange carried by said members and means for forcing said flange into frictional engagement with the felly band of the wheel and the rim.

8. The combination with a wheel of a rim, arcuate members pivotally related one to the other, one of said members being less than half a circle, said members comprising a circle, an inwardly extending flange adapted to lie between the felly of said wheel and said rim, and means for forcing said members at right angles to the plane of said wheel.

9. The combination with a wheel of a rim, arcuate member of different lengths, an inwardly extending flange carried by said members and adapted to lie between the felly of the wheel and the rim, and means for imparting movement to said members at substantially right angles to the plane of the wheel.

10. The combination of a wheel with a rim, arcuate members, pivotally related one to the other, inwardly extending flanges carried by said members and adapted to lie between said wheel and said rim, and outwardly extending flanges at right angles to the first named flanges and means for imparting movement to the said members at substantially right angles to the plane of the wheel.

11. The combination of a wheel with a rim, arcuate members pivotally related one to the other, inwardly extending flanges carried by said members and adapted to lie between said wheel and said rim, and outwardly extending flanges at right angles to the first named flanges, the last named flanges being cut away for a portion of their length adjacent to their ends, and means for imparting movement to the said members at right angles to the plane of the wheel.

In testimony whereof I affix my signature.

WALTER I. HOPKINS.